(12) United States Patent
Usuda

(10) Patent No.: US 8,388,048 B2
(45) Date of Patent: Mar. 5, 2013

(54) REINFORCING STRUCTURE FOR VEHICLE BODY FRONT PART

(75) Inventor: Yoshitaka Usuda, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/098,717

(22) Filed: May 2, 2011

(65) Prior Publication Data

US 2011/0272970 A1 Nov. 10, 2011

(30) Foreign Application Priority Data

May 7, 2010 (JP) ................................. 2010-107083

(51) Int. Cl.
*B62D 25/14* (2006.01)
(52) U.S. Cl. ................. 296/203.02; 296/72; 296/193.09
(58) Field of Classification Search ............. 296/193.02, 296/203.02, 29, 30, 72, 193.09, 192, 187.09
See application file for complete search history.

(56) References Cited

U.S. PATENT DOCUMENTS

| | | | | |
|---|---|---|---|---|
| 5,562,329 A * | 10/1996 | Srock et al. | ............... | 296/203.01 |
| 6,364,401 B1 * | 4/2002 | Kim | ................... | 296/203.02 |
| 6,817,657 B2 * | 11/2004 | Watanabe et al. | ........ | 296/203.02 |
| 7,147,275 B2 * | 12/2006 | Matsuyama et al. | ..... | 296/203.02 |
| 7,267,394 B1 * | 9/2007 | Mouch et al. | ............. | 296/203.02 |
| 7,556,310 B2 * | 7/2009 | Miki | .............................. | 296/204 |
| 7,703,805 B2 * | 4/2010 | Sasaki et al. | .................. | 280/784 |
| 7,766,420 B2 * | 8/2010 | Maruyama et al. | ....... | 296/203.02 |
| 7,832,795 B2 * | 11/2010 | Yokoi et al. | .................... | 296/204 |
| 7,845,716 B2 * | 12/2010 | Kiyotake et al. | ......... | 296/203.02 |
| 7,887,123 B2 * | 2/2011 | Honji et al. | ............... | 296/187.09 |
| 2002/0195840 A1 * | 12/2002 | Mishima et al. | ......... | 296/203.01 |
| 2008/0150326 A1 * | 6/2008 | Maruyama et al. | ........... | 296/192 |

FOREIGN PATENT DOCUMENTS

| CN | 101090845 A | 12/2007 |
|---|---|---|
| JP | 2003-154968 A | 5/2003 |

OTHER PUBLICATIONS

Chinese Office Action for Application No. 201110117367.8 dated Oct. 22, 2012.

* cited by examiner

*Primary Examiner* — Glenn Dayoan
*Assistant Examiner* — Gregory Blankenship
(74) *Attorney, Agent, or Firm* — Lerner, David, Littenberg, Krumholz & Mentlik, LLP

(57) ABSTRACT

A reinforcing structure for a vehicle body front part has a reinforcing member 10 disposed at a corner portion 9 formed by a dash panel 5 and a dash side panel 6. The reinforcing member 10 includes a plate-like main body portion 11 that has a width in a horizontal direction and extends between the dash panel 5 and the dash side panel 6 near the corner portion 9, a first connection portion 12 that is provided at a first end portion 11*a* of the main body portion 11 and extends in a vehicle vertical direction, and a second connection potion 13 that is provided at a second end portion 11*b* of the main body portion 11 and extends in the vehicle vertical direction. The dash panel 5 and the first connection portion 12 of the reinforcing member 10 are connected to each other by welding, and the dash side panel 6 and the second connection portion 13 of the reinforcing member 10 are connected to each other by welding.

3 Claims, 4 Drawing Sheets

REINFORCING STRUCTURE FOR VEHICLE BODY FRONT PART

BACKGROUND OF THE INVENTION

1. Field of the Invention

The present invention relates to a reinforcing structure for a vehicle body front part, and more specifically relates to a reinforcing structure at a corner portion formed by a dash panel disposed at the vehicle body front part and a dash side panel disposed at each of both end portions of the dash panel.

2. Description of Related Art

A reinforcing structure for a vehicle body front part has been heretofore proposed. In this reinforcing structure, a reinforcing member receives load applied on a dash panel and dash side panels upon collision of the vehicle, thereby suppressing deformation of the vehicle body front part (see, for example, JP 2003-154968 A).

FIG. 5 is a cross-sectional view showing an example of a conventional reinforcing structure for a vehicle body front part.

As shown in FIG. 5, a front body 21 located in a front part of a vehicle body 1 is provided with a dash panel 22, and a dash side panel 23 extending in a vehicle front-rear direction is disposed on each of both end portions of the dash panel 22 in a vehicle width direction.

As shown in FIG. 5, a flange portion 22a of the dash panel 22 and a flange portion 23a of the dash side panel 23 are connected to each other by spot welding. A side panel 24 is provided on an outer side of the dash side panel 23 in the vehicle width direction. The side panel 24 is connected to the dash side panel 23 at a position near the connection portion between the flange portion 22a of the dash panel 22 and the flange portion 23a of the dash side panel 23.

As shown in FIG. 5, a corner portion 25 formed by the flange portion 22a of the dash panel 22 and the flange portion 23a of the dash side panel 23 is provided with a reinforcing member (brace) 26. The reinforcing member 26 is formed of a plate-like material that is extended in a vehicle vertical direction, and is curved to form an L shape along the corner portion 25.

As shown in FIG. 5, a first end portion 26a of the reinforcing member 26 at the side of the dash panel 22 is mounted on the dash panel 22 with a first reinforcing component 27 interposed therebetween. The first end portion 26a of the reinforcing member 26 is fastened to the first reinforcing component 27 by a first bolt 28 and a first nut 32.

In addition, as shown in FIG. 5, a second end portion 26b of the reinforcing member 26 at the side of the dash side panel 23 is fastened to the dash side panel 23 by a second bolt 30 and a second nut 33 while being backed with a second reinforcement component 29.

The conventional reinforcing structure for a vehicle body front part of FIG. 5 is assembled by the following procedures.

First, the flange portion 22a of the dash panel 22 and the flange portion 23a of the dash side panel 23 are connected to each other by spot welding.

Next, a sealer 31 is applied to the connection portion between the flange portion 22a of the dash panel 22 and the flange portion 23a of the dash side panel 23.

Then, the reinforcing member 26 is fastened to the first reinforcing component 27 by the first bolt 28 and the first nut 32.

Finally, the reinforcing member 26 is fastened by the second bolt 30 and the second nut 33.

The assembling of the conventional reinforcing structure for a vehicle body front part is completed by the above procedures.

Unfortunately, the conventional reinforcing structure of FIG. 5 has the following problem. Specifically, since the reinforcing member 26 is not extended in the horizontal direction, the reinforcing member 26 cannot sufficiently support the load applied in the horizontal direction when the vehicle body front part receives an impact due to a collision of the vehicle. Accordingly, the dash panel 22 and the dash side panel 23 do not have sufficient strength.

Moreover, in the conventional reinforcing structure, the reinforcing component 26 has to be mounted at a step in the finishing section because the sealer 31 is applied at the coating step.

Furthermore, in the assembling procedures of the conventional reinforcing structure, the reinforcing member 26 is mounted at the step in the finishing section which is the final section. Thus, the intermediate assembly is transported and assembled with other components without having stiffness secured in connection between the dash panel 22 and the dash side panel 23. Thus, misalignment between the dash panel 22 and the dash side panel 23 (difference in position between the first and the second bolts 28 and 30 and the like) is likely to occur at the transporting and the mounting of other components.

This produces problems in that, when the misalignment occurs, an operator has to mount the reinforcing member 26 while compensating for the misalignment at the step in the finishing section, and in addition, that heavy work load is imposed on the operator at the step in the finishing section due to low workability of the operation inside the cabin.

Still furthermore, the reinforcing member 26 is fixed using the first and the second bolts 28 and 30 in the conventional case. Thus, when the dash panel 22 or the like is directly provided with holes for the bolts, the positions of the holes have to be provided with sealing measures to prevent liquid or sound from entering the cabin.

On the other hand, when the dash panel 22 or the like is not directly provided with holes for the bolts, the reinforcing member 26 is fixed to the dash panel 22 with another component (for example, the first reinforcing component 27 and the like) interposed therebetween.

As described above, in any of the cases, there is a problem in that the conventional structure in which the reinforcing member 26 is fixed using the bolts requires a cost for the components and the like and additional assembling steps.

If the reinforcing member 26 is mounted at a vehicle body section instead of the finishing section, facilities and cost have to be increased. This is because an elaborate procedure such as sandwiching the sealer 31 between the flange portion 22a of the dash panel 22 and the flange portion 23a of the dash side panel 23 is required to apply the sealer 31 to the connecting portion between the flange portion 22a and the flange portion 23a.

SUMMARY OF THE INVENTION

The present invention has been made in view of the above circumstances. An object of the present invention is to provide a reinforcing structure for a vehicle body front part that provides sufficient strength against the load in the horizontal direction received by the vehicle body front part upon collision of the vehicle, and can be manufactured with high workability in assembling and with reduced cost while the sealer is applied at the coating section.

In order to solve the above problem of the conventional technique, a reinforcing structure for a vehicle body front part according to the present invention comprises a reinforcing member provided at a corner portion formed by a dash panel disposed at the vehicle body front part and a dash side panel disposed at each of both end portions of the dash panel in a vehicle width direction, wherein the reinforcing member includes a plate-like main body portion that has a width in a horizontal direction and extends between the dash panel and the dash side panel at a position near the corner portion, a first connection portion that is provided at a first end portion on a side of the dash panel of the main body portion and extends in a vehicle vertical direction along the dash panel, and a second connection potion that is provided at a second end portion on a side of the dash side panel of the main body portion and extends in the vehicle vertical direction along the dash side panel, and the dash panel and the first connection portion of the reinforcing member are connected to each other by welding and the dash side panel and the second connection portion of the reinforcing member are connected to each other by welding.

In addition, according to another aspect of the present invention, a side panel of the vehicle body extends to a portion on an outer side surface of the dash side panel in a vehicle width direction, the portion corresponding to the second connection portion of the reinforcing member, a notch or a hole is provided in the second connection portion, and the dash side panel and the side panel are connected to each other by welding at the position of the notch or the hole in the second connection portion.

A reinforcing structure for a vehicle body front part according to the present invention includes a reinforcing member provided at a corner portion formed by a dash panel disposed at the vehicle body front part and a dash side panel disposed at each of both end portions of the dash panel in a vehicle width direction, wherein the reinforcing member includes a plate-like main body portion that has a width in a horizontal direction and extends between the dash panel and the dash side panel at a position near the corner portion, a first connection portion that is provided at a first end portion on a side of the dash panel of the main body portion and extends in a vehicle vertical direction along the dash panel, and a second connection potion that is provided at a second end portion on a side of the dash side panel of the main body portion and extends in the vehicle vertical direction along the dash side panel, and the dash panel and the first connection portion of the reinforcing member are connected to each other by welding and the dash side panel and the second connection portion of the reinforcing member are connected to each other by welding. With this structure, the load in the horizontal direction received by the vehicle body front part upon collision of the vehicle is supported by the main body portion that is extended in the horizontal direction and is laid between two sides at the corner portion. Therefore, the strength against the load in the horizontal direction can be increased compared with the conventional reinforcing component that is not extended in the horizontal direction.

In the conventional case, the reinforcing member is mounted in a step in the finishing section which is the final section. Thus, the intermediate assembly is transported and assembled with other components without having stiffness secured in connection between the dash panel and the dash side panel, whereby accurate assembling is difficult and misalignment between the dash panel and the dash side panel is likely to occur. In contrast, in the present invention, the main body portion of the reinforcing member is formed to have a plate shape extended in the horizontal direction. Thus, the connection portion by the flange portion of the dash panel and the flange portion of the dash side panel can be coated with the sealer, and the dash panel, the dash side panel, and the reinforcing member can be connected simultaneously. This prevents the misalignment from occurring at the transportation and the mounting of other components in the later steps.

Moreover, in the conventional case, the reinforcing member is fixed to the dash panel with another component (for example, the first reinforcing component and the like) interposed therebetween when the reinforcing member is mounted. In the present invention on the other hand, the reinforcing member can be directly fixed to the dash panel and the like by welding. Thus, components such as bolts are not required, and the cost and the number of assembling steps can be reduced.

In addition, according to the reinforcing structure for a vehicle body front part of the present invention, a side panel of the vehicle body extends to a portion on an outer side surface of the dash side panel in a vehicle width direction, the portion corresponding to the second connection portion of the reinforcing member, a notch or a hole is provided in the second connection portion, and the dash side panel and the side panel are connected to each other by welding at the position of the notch or the hole in the second connection portion. Thus, when the vehicle body front part receives impact due to the collision of the vehicle and the like, the load applied on the second connection portion of the reinforcing member is supported by both dash side panel and the side panel. Thereby, the load applied on the second connection portion can be dispersedly received by the two members, i.e., the dash side panel and the side panel. As a result, the load applied on the second connection portion is not concentrated on the dash side panel. Thus, deformation, rearward displacement, and the like of the dash side panel, for example, can be effectively prevented.

DETAILED DESCRIPTION OF PREFERRED EMBODIMENTS

A reinforcing structure for a vehicle body front part according to an embodiment of the present invention is described below with reference to the drawings.

Figure 1:
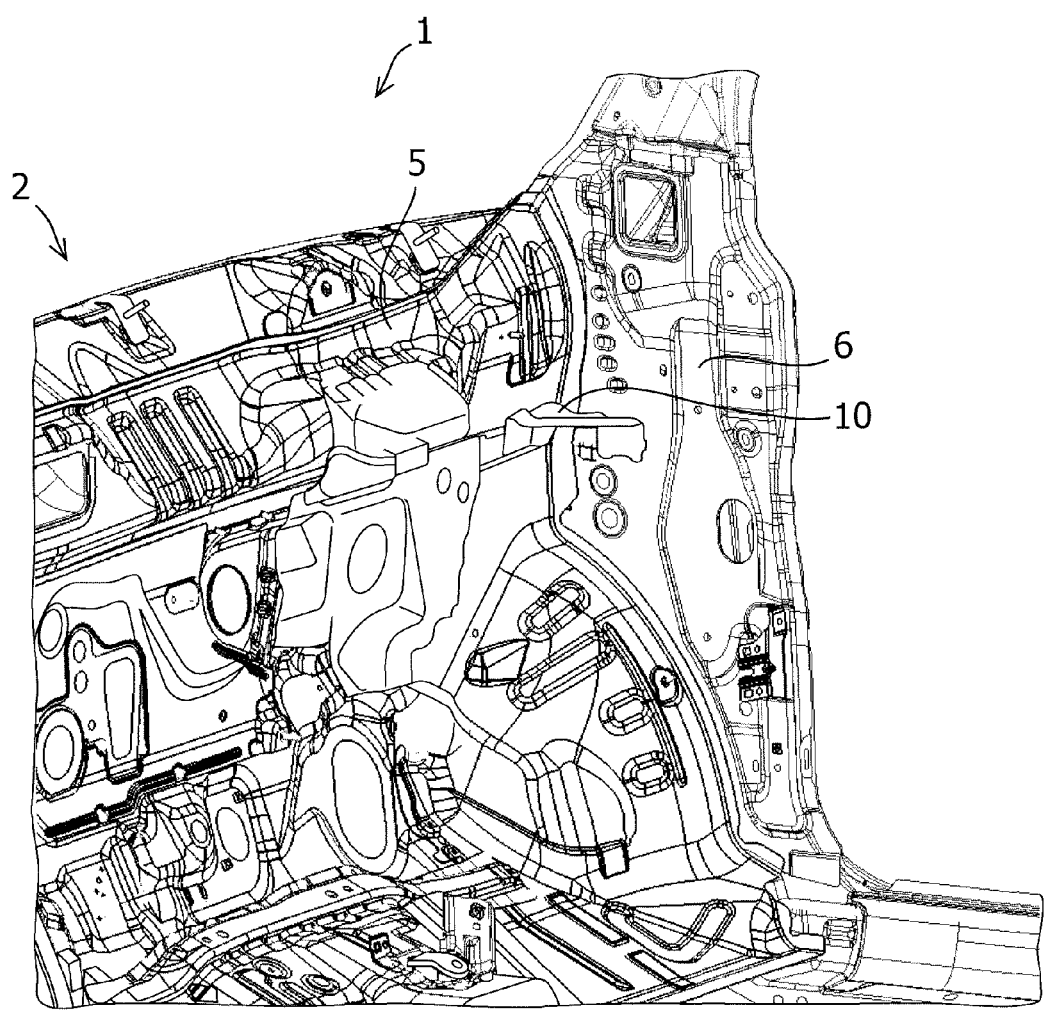
FIG. 1 is a perspective view of a reinforcing structure for a vehicle body front part according to an embodiment of the present invention viewed from a cabin inner side.
Figure 2:
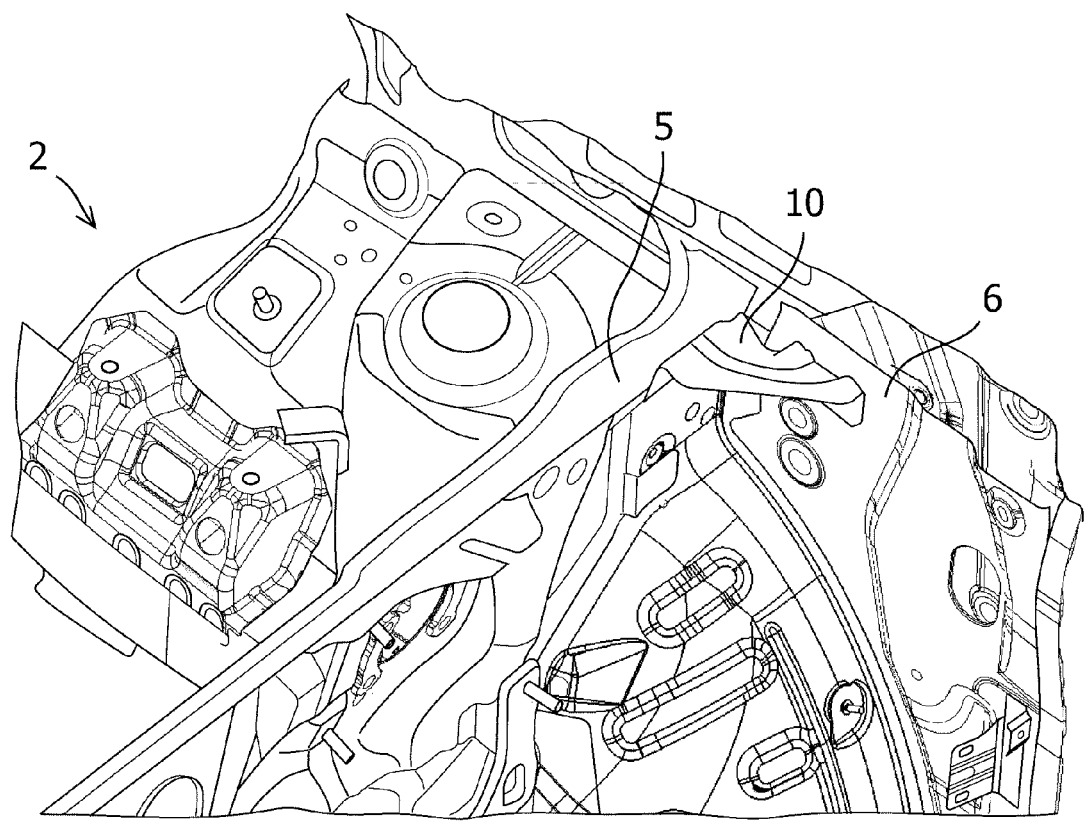
FIG. 2 is a perspective view of the reinforcing structure for a vehicle body front part according to the embodiment of the present invention viewed from above.
Figure 3:
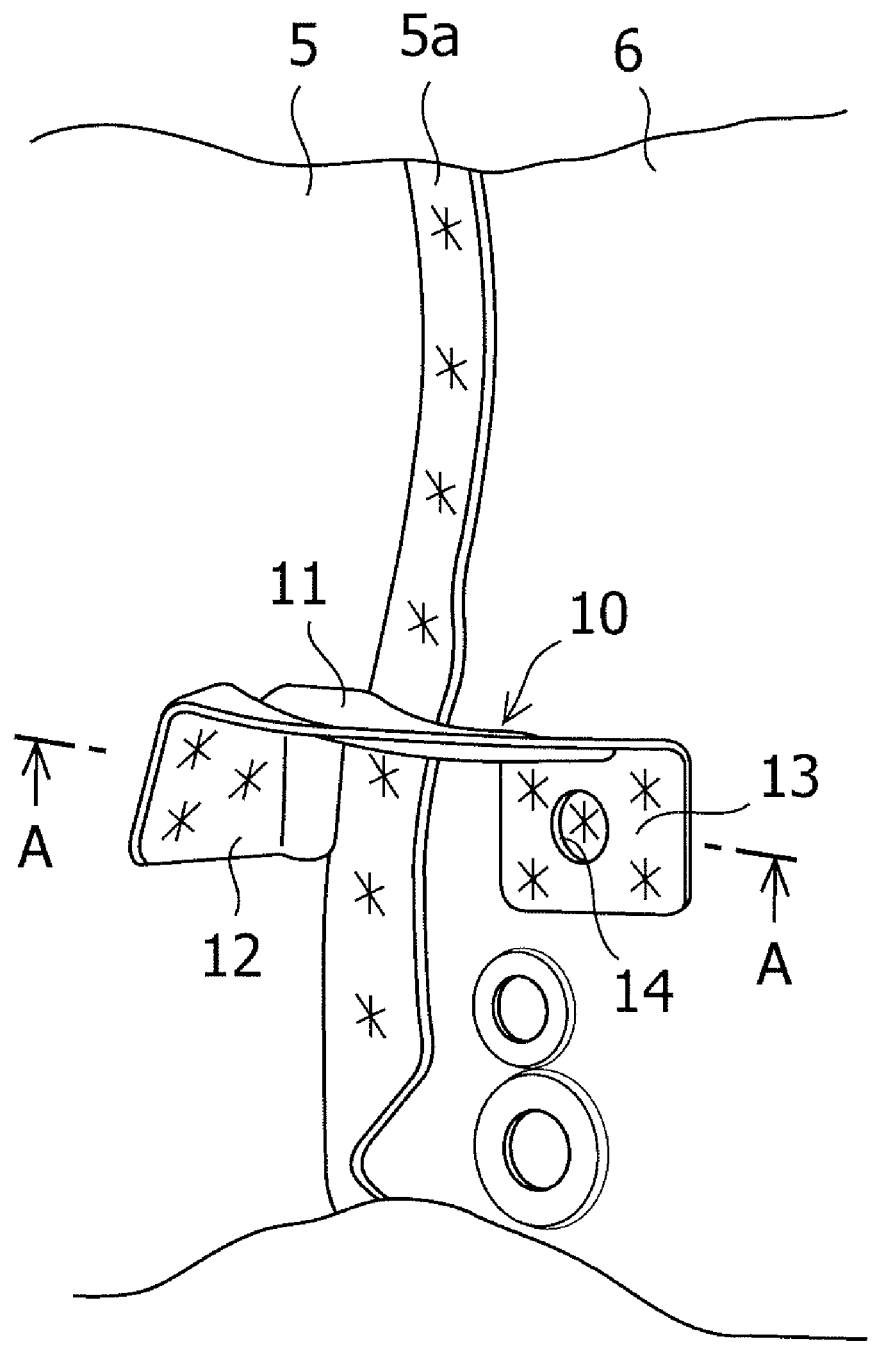
FIG. 3 is a view of the reinforcing structure for a vehicle body front part according to the embodiment of the present invention viewed from a cabin inner side.
Figure 4:
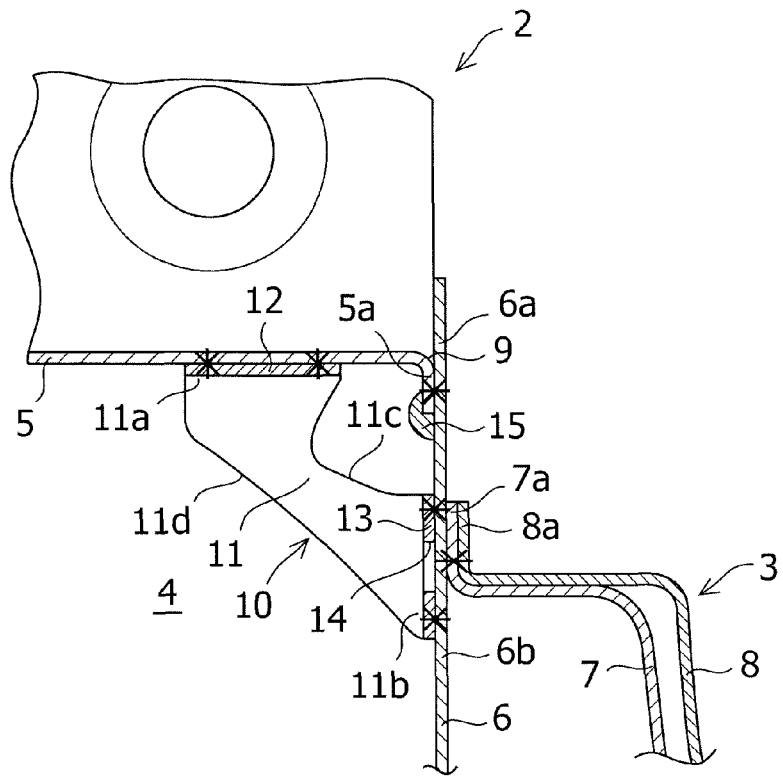
FIG. 4 is a cross-sectional view taken along a line A-A in FIG. 3.

FIG. 1 is a perspective view of a reinforcing structure for a vehicle body front part according to an embodiment of the present invention viewed from a cabin inner side. FIG. 2 is a perspective view of the reinforcing structure for a vehicle body front part according to the embodiment of the present invention viewed from above. FIG. 3 is a view of the reinforcing structure for a vehicle body front part according to the embodiment of the present invention viewed from a cabin inner side. FIG. 4 is a cross-sectional view taken along a line A-A in FIG. 3. In the figures, members on the vehicle body right side are described and descriptions for members on the vehicle body left side are omitted.

As shown in FIGS. 1, 2 and 4, a front part of a vehicle body 1 includes a front body 2 that supports an engine (not illustrated) and a front suspension (not illustrated), and a side body 3 (See FIG. 4) that is connected to each of the left and the right sides of a rear portion of the front body 2.

As shown in FIG. 1 to FIG. 4, the front body 2 includes a dash panel 5 that separates an engine room (not illustrated) and a cabin 4 (see FIG. 4). On each of both end portions in the vehicle width direction, the dash panel 5 is provided with a dash side panel 6 that extends in the vehicle front-rear direction.

As shown in FIG. 4, the side body 3 is disposed on the outer side in the vehicle width direction with respect to the dash side panel 6. The side body 3 includes a side inner panel 7 provided at a side of the cabin 4 and a side outer panel 8 provided on the outer side of the side inner panel 7.

As shown in FIG. 3 and FIG. 4, a corner portion 9 formed by a flange portion 5a of the dash panel 5 and a flange portion 6a of the dash side panel 6 is provided with a reinforcing member (brace) 10.

As shown in FIG. 1 to FIG. 4, the reinforcing member 10 includes a main body portion 11 that extends between the dash panel 5 and the dash side panel 6 near the corner portion 9, a first connection portion 12 provided at a first end portion 11a on a side of the dash panel 5 of the main body portion 11, and a second connection portion 13 provided at a second end portion 11b on a side of the dash side panel 6 of the main body portion 11. The first connection portion 12 extends downward along the dash panel 5, and the second connection portion 13 extends downward along the dash side panel 6.

As shown in FIG. 3 and FIG. 4, the main body portion 11 of the reinforcing member 10 is formed of a plate-like material that has a width in the horizontal direction. As shown in FIG. 4, the main body portion 11 is formed to become wider at the portions near the first end portion 11a and the second end portion 11b. As shown in FIG. 4, a first edge portion 11c on the side of the corner portion 9 of the main body portion 11 is formed with a notch. A second edge portion 11d located on the main body portion 11 on the side opposite to the first edge portion 11c linearly extends to obliquely connect the dash panel 5 and the dash side panel 6.

As shown in FIG. 3, the first connection portion 12 of the reinforcing member 10 is formed to have a rectangular shape in side view. The second connection portion 13 of the reinforcing member 10 is also formed to have a rectangular shape in side view. A connection hole 14 is formed at the center portion of the second connection portion 13.

As shown in FIG. 3 and FIG. 4, the flange portion 5a of the dash panel 5 and the flange portion 6a of the dash side panel 6 are connected to each other at the position of the corner portion 9 by spot welding. The connection portion between the flange portion 5a of the dash panel 5 and the flange portion 6a of the dash side panel 6 is coated with a sealer 15 to prevent liquid and sound from entering the cabin 4.

As shown in FIG. 3, the dash panel 5 and the first connection portion 12 of the reinforcing member 10 are spot welded at five points. The dash side panel 6 and the second connection portion 13 of the reinforcing member 10 are spot welded at four points surrounding the connection hole 14.

As shown in FIG. 4, a flange portion 7a of the side inner panel 7 and a flange portion 8a of the side outer panel 8 extend on a side surface 6b of the dash side panel 6 on the outer side in the vehicle width direction. The flange portion 7a of the side inner panel 7 and the flange portion 8a of the side outer panel 8 extend to a position corresponding to the second connection portion 13 of the reinforcing member 10, and overlap with each other at the position. As shown in FIG. 3 and FIG. 4, three pieces, namely the dash side panel 6, the flange portion 7a of the side inner panel 7, and the flange portion 8a of the side outer panel 8 are connected at the position of the connection hole 14 of the second connection portion 13 by spot welding.

Next, procedures for mounting the members of the vehicle body front part according to the embodiment of the present invention are described below with reference to the drawings.

First, the flange portion 5a of the dash panel 5 and the flange portion 6a of the dash side panel 6 are connected to each other by spot welding as shown in FIG. 3 and FIG. 4. At this point, the reinforcing member 10 is also connected to the dash panel 5 and the dash side panel 6 by spot welding. More specifically, the first connection portion 12 of the reinforcing member 10 is connected to the dash panel 5 by spot welding while the second connection portion 13 of the reinforcing member 10 is connected to the dash side panel 6 by spot welding.

Next, the three pieces, namely the dash side panel 6, the flange portion 7a of the side inner panel 7, and the flange portion 8a of the side outer panel 8 are connected at the position of the connection hole 14 of the second connection portion 13 by spot welding.

Finally, the connection portion between the flange portion 5a of the dash panel 5 and the flange portion 6a of the dash side panel 6 is coated with the sealer 15. At this point, the portion at which the reinforcing member 10 is provided is coated with the sealer 15 by utilizing the notch shape of the first edge portion 11c of the main body portion 11.

The mounting of the members of the vehicle body front part is completed by the above procedures.

As described above, a reinforcing structure for a vehicle body front part according to the embodiment comprises a reinforcing member 10 provided at a corner portion 9 formed by a dash panel 5 disposed at the vehicle body 1 front part and a dash side panel 6 disposed at each of both end portions of the dash panel 5 in a vehicle width direction, wherein the reinforcing member 10 includes a plate-like main body portion 11 that has a width in a horizontal direction and extends between the dash panel 5 and the dash side panel 6 at a position near the corner portion 9, a first connection portion 12 that is provided at a first end portion 11a on a side of the dash panel 5 of the main body portion 11 and extends in a vehicle vertical direction along the dash panel 5, and a second connection potion 13 that is provided at a second end portion 11b on a side of the dash side panel 6 of the main body portion 11 and extends in the vehicle vertical direction along the dash side panel 6, and the dash panel 5 and the first connection portion 12 of the reinforcing member 10 are connected to each other by welding and the dash side panel 6 and the second connection portion 13 of the reinforcing member 10 are connected to each other by welding. Accordingly, the load in the horizontal direction received by the vehicle body front part upon collision of the vehicle is supported by the main body portion 11 that is extended in the horizontal direction and is laid between two sides at the corner portion 9. Thus, the strength against the load in the horizontal direction can be increased compared with the conventional reinforcing component that is not extended in the horizontal direction.

Figure 5:
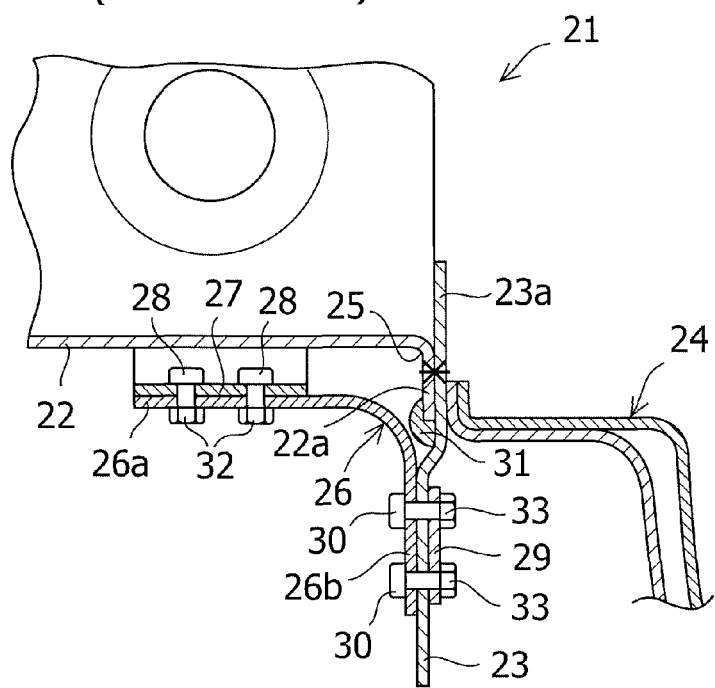
FIG. 5 is a cross-sectional view of a conventional reinforcing structure for a vehicle body front part.

In the conventional case of FIG. 5, the reinforcing member 26 is mounted in a step in the finishing section which is the final section. Thus, the intermediate assembly is transported and assembled with other components without having stiffness secured in connection between the dash panel 22 and the dash side panel 23, whereby misalignment between the dash panel 22 and the dash side panel 23 is likely to occur.

In contrast, the present invention allows the reinforcing member 10 to be connected by wielding when the dash panel 5 and the dash side panel 6 are connected to each other. Thus, no misalignment occurs at the transporting or the mounting of other components, an assembling operation by the operator at the finishing section is not required, and work load on the operator in the finishing section is reduced.

Moreover, in the conventional case of FIG. 5, the reinforcing member 26 is fixed to the dash panel 22 with another component (for example, the first reinforcing component 27 and the like) interposed therebetween when the reinforcing member 26 is mounted.

In the present invention on the other hand, the reinforcing member 10 can be directly fixed to the dash panel 5 and the like by welding. Thus, other components, bolts and the like are not required, and the cost and the number of assembling steps can be reduced.

In addition, according to the reinforcing structure for a vehicle body front part of the embodiment, a side inner panel 7 and a side outer panel 8 of a side panel 3 of the vehicle body 1 extend to a portion of an outer side surface 6b of the dash side panel 6 in a vehicle width direction, the portion corresponding to the second connection portion 13 of the reinforcing member 10, a connection hole 14 is formed in the second connection portion 13, and the three members, namely the dash side panel 6, the flange portion 7a of the side inner panel 7, and the flange portion 8a of the side outer panel 8 are connected together at the position of the connection hole 14 of the second connection portion 13 by spot welding. Thus, when the vehicle body front part receives impact due to the collision of the vehicle and the like, the load applied on the second connection portion 13 of the reinforcing member 10 is supported by both dash side panel 6 and the side panel 3. Thereby, the load applied on the second connection portion 13 can be dispersedly received by the two members, i.e., the dash side panel 6 and the side panel 3. As a result, the load applied on the second connection portion 13 is not concentrated on the dash side panel 6. Thus, deformation, rearward displacement, and the like of the dash side panel 6, for example, can be effectively prevented.

The embodiment of the present invention is described above. The present invention is not limited to the embodiment described above, and various modifications and changes can be made thereto based on the technical idea of the present invention.

The first connection portion 12 and the second connection portion 13 of the reinforcing member 10, which extend downward from the main body portion 11 in the embodiment, may extend upward from the main body portion 11 as long as they extend respectively along the dash panel 5 and the dash side panel 6.

In the embodiment, the connection hole 14 is formed in the second connection portion 13. The connection portion is not limited to the hole, and a notch may be formed instead.

In the embodiment, the side inner panel 7 and the side outer panel 8 of the side panel 3 extend to a position corresponding to the second connection portion 13 of the reinforcing member 10, and are connected by spot welding at the position of the connection hole 14 of the second connection portion 13. The extended member is not limited to the side panel 3, and other panels near the dash panel 5 and the dash side panel 6 may extend to the position corresponding to the second connection portion 13 of the reinforcing member 10 to be connected thereat.

In the embodiment, the reinforcing member 10 is mounted to the dash panel 5 and the like by spot welding. Instead, welding using $CO_2$ or laser may be employed.

DESCRIPTION OF REFERENCE SYMBOLS

1 VEHICLE BODY
2 FRONT BODY
3 SIDE BODY
4 CABIN
5 DASH PANEL
6 DASH SIDE PANEL
7 SIDE INNER PANEL
8 SIDE OUTER PANEL
9 CORNER PORTION
10 REINFORCING MEMBER
11 MAIN BODY PORTION
12 FIRST CONNECTION PORTION
13 SECOND CONNECTION PORTION
14 CONNECTION HOLE
15 SEALER

What is claimed is:

1. A reinforcing structure for a vehicle body front part, including
   a reinforcing member provided across a corner portion in which a dash panel disposed at the vehicle body front part is welded to a dash side panel disposed at each of both end portions of the dash panel in a vehicle width direction,
   the reinforcing member comprising:
   a plate-like main body portion that has a width in a horizontal direction and extends between the dash panel and the dash side panel near the corner portion;
   a first connection portion that is provided at a first end portion on a side of the dash panel of the main body portion and extends in a vehicle vertical direction along the dash panel, the first connection portion being welded to the dash panel; and
   a second connection portion that is provided at a second end portion on a side of the dash side panel of the main body portion and extends in the vehicle vertical direction along the dash side panel, the second connection portion being welded to the dash side panel,
   wherein the plate-like main body portion has a cutout on the side of the corner portion so as to be located away from the corner portion.

2. The reinforcing structure according to claim 1, wherein
   a side panel of the vehicle body extends to a portion on an outer side surface of the dash side panel in a vehicle width direction, the portion corresponding to the second connection portion of the reinforcing member,
   a notch or a hole is provided in the second connection portion, and
   the dash side panel and the side panel are connected to each other by welding at the position of the notch or the hole in the second connection portion.

3. A reinforcing structure for a vehicle body front part, comprising
   a reinforcing member provided at a corner portion formed by a dash panel disposed at the vehicle body front part and a dash side panel disposed at each of both end portions of the dash panel in a vehicle width direction,
   wherein the reinforcing member includes
   a plate-like main body portion that has a width in a horizontal direction and extends between the dash panel and the dash side panel near the corner portion;

a first connection portion that is provided at a first end portion on a side of the dash panel of the main body portion and extends in a vehicle vertical direction along the dash panel; and a second connection portion that is provided at a second end portion on a side of the dash side panel of the main body portion and extends in the vehicle vertical direction along the dash side panel, wherein the dash panel and the first connection portion of the reinforcing member are connected to each other by welding and the dash side panel and the second connection portion of the reinforcing member are connected to each other by welding, wherein a side panel of the vehicle body extends to a portion on an outer side surface of the dash side panel in a vehicle width direction, the portion corresponding to the second connection portion of the reinforcing member, wherein a notch or a hole is provided in the second connection portion, and wherein the dash side panel and the side panel are connected to each other by welding at the position of the notch or the hole in the second connection portion.

* * * * *